US012720271B1

(12) United States Patent
Thall et al.

(10) Patent No.: US 12,720,271 B1
(45) Date of Patent: Aug. 25, 2026

(54) SPATIAL MODELER

(71) Applicant: Apple Inc., Cupertino, CA (US)

(72) Inventors: David Thall, West Hollywood, CA (US); Bharathidasan Venkatesan, Fremont, CA (US); Andrew J. Klinzing, Costa Mesa, CA (US); Pedro M. De Sa Carvalho Corvo, West Hollywood, CA (US); Thomas G. Parker, San Francisco, CA (US); Edward L. Stein, Soquel, CA (US)

(73) Assignee: Apple Inc., Cupertino, CA (US)

( * ) Notice: Subject to any disclaimer, the term of this patent is extended or adjusted under 35 U.S.C. 154(b) by 305 days.

(21) Appl. No.: 18/446,367

(22) Filed: Aug. 8, 2023

Related U.S. Application Data

(60) Provisional application No. 63/396,529, filed on Aug. 9, 2022.

(51) Int. Cl.
*H04S 7/00* (2006.01)
*H04S 3/00* (2006.01)

(52) U.S. Cl.
CPC .............. *H04S 7/303* (2013.01); *H04S 3/008* (2013.01); *H04S 2400/01* (2013.01); *H04S 2400/11* (2013.01); *H04S 2420/01* (2013.01)

(58) Field of Classification Search
None
See application file for complete search history.

(56) References Cited

U.S. PATENT DOCUMENTS 12,143,789 B1 * 11/2024 Russell ..................... H04S 5/00
2012/0070011 A1 * 3/2012 Van Baelen ............ H04S 3/002 381/63
2014/0023197 A1 * 1/2014 Xiang ..................... H04S 1/007 381/17
2016/0034248 A1 * 2/2016 Schissler ................ H04R 27/00 381/17
2021/0035597 A1 * 2/2021 Eubank ................... H04S 7/304
2021/0076152 A1 * 3/2021 Leppänen ............... H04S 7/303
2022/0337968 A1 * 10/2022 Jang ........................ H04S 7/302
2023/0073568 A1 * 3/2023 Laaksonen ............. H04R 5/033
2023/0328471 A1 * 10/2023 Singh ...................... H04S 7/302 381/303

FOREIGN PATENT DOCUMENTS

WO WO-2016169591 A1 * 10/2016 ............. H04M 3/56
WO WO-2019106221 A1 * 6/2019

OTHER PUBLICATIONS

Tsingos et al., "Perceptual Audio Rendering of Complex Virtual Environments". pp. 1-10. (2004). (Year: 2004).*
Oculus VR, "Simulating Dynamic Soundscapes at Facebook Reality Labs", received from https://www.meta.com/blog/quest/simulating-dynamic-soundscapes-at-facebook-reality-labs/, Oct. 25, 2018, 9 pages.

* cited by examiner

*Primary Examiner* — Qin Zhu
(74) *Attorney, Agent, or Firm* — Aikin & Gallant, LLP

(57) ABSTRACT

A method may include selecting a subset of sound sources from a plurality of sound sources in a scene, based on audibility of each of the plurality of sound sources. One or more clusters of sound sources are generated with the subset of sound sources. Spatial information of the subset of the sound sources is obtained from the scene. The subset of sound sources is spatially rendered as part of the same cluster according to the spatial information. Other aspects are also described and claimed.

20 Claims, 4 Drawing Sheets

SPATIAL MODELER

This nonprovisional patent application claims the benefit of the earlier filing date of U.S. provisional application No. 63/396,529 filed Aug. 9, 2023.

BACKGROUND

A processing device, such as a computer, a smart phone, a tablet computer, or a wearable device, can run an application that plays audio to a user. For example, a computer can launch an audio application such as a movie player, a music player, a conferencing application, a phone call, an alarm, a game, a user interface, a web browser, or other application that is associated with an audio output that is played back to a user through speakers. An application may have sound sources that are rendered with spatial qualities.

SUMMARY

In some aspects, a device, comprising a processor may be configured to select a subset of sound sources from a plurality of sound sources in a scene, based on audibility of each of the plurality of sound sources. The processor may generate one or more clusters of sound sources with the subset of sound sources and with spatial information of the subset of sound sources taken from the scene. The subset of sound sources is spatially rendered as a single cluster, together with one other sound source that is spatially rendered individually. In such a manner, audio of a scene may be spatially rendered in an efficient manner. Sound sources that are barely audible or inaudible may be excluded from consideration and ignored by the spatial renderer.

Further, the processor may determine parameters used to control how certain sound sources are culled (or excluded from playback) while other sound sources are clustered, to adjust and tailor the spatial audio process according to several factors such as device resource constraints, the usage of the device, environmental conditions, or other factors.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
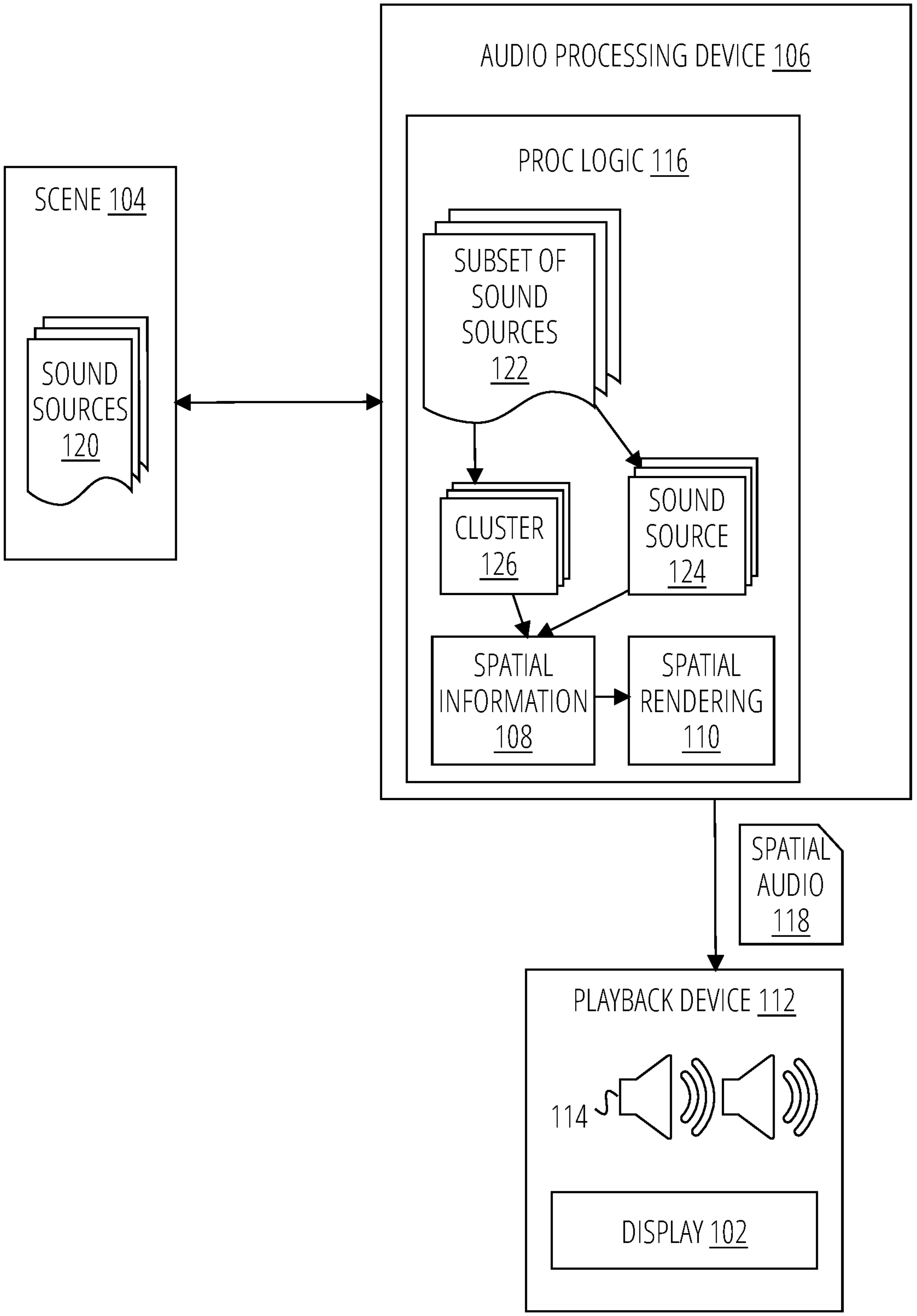
FIG. 1 shows an example of an audio processing device for spatially rendering a scene, in accordance with some aspects.

Humans can estimate the location of a sound by analyzing the sounds at their two cars. This is known as binaural hearing and the human auditory system can estimate directions of sound using the way sound diffracts around and reflects off our bodies and interacts with our pinna. These spatial cues can be artificially generated by applying spatial filters such as head-related transfer functions (HRTFs) or head-related impulse responses (HRIRs) to audio signals. HRTFs are applied in the frequency domain and HRIRs are applied in the time domain.

The spatial filters can artificially impart spatial cues into the audio that resemble the diffractions, delays, and reflections that are naturally caused by our body geometry and pinna. The spatially filtered audio can be produced by a spatial audio reproduction system (a renderer) and output through headphones. Spatial audio can be rendered for playback, so that the audio is perceived to have spatial qualities, for example, originating from a location above, below, or to the side of a listener.

The spatial audio may correspond to visual components that together form an audiovisual work. An audiovisual work may be associated with an application, a user interface, a movie, a live show, a sporting event, a game, a conferencing call, or other audiovisual experience. In some examples, the audiovisual work may be integral to extended reality (XR) environment and sound sources of the audiovisual work may correspond to one or more virtual objects in the XR environment. An XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user like how such views and sounds would change in a physical environment. In another example, the XR system can detect movement of an electronic device that presents the XR environment (e.g., a mobile phone, tablet, laptop, or the like) and adjust graphical content and auditory content presented to the user like how such views and sounds would change in a physical environment. In some situations, the XR system can adjust characteristic(s) of graphical content in response to other inputs, such as a representation of a physical motion (e.g., a vocal command).

Many distinct types of electronic systems can enable a user to interact with and/or sense an XR environment. A non-exclusive list of examples includes heads-up displays (HUDs), head mountable systems, projection-based systems, windows, or vehicle windshields having integrated display capability, displays formed as lenses to be placed on users' eyes (e.g., contact lenses), headphones/earphones, input systems with or without haptic feedback (e.g., wearable, or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface). Immersive experiences such as an XR environment, or other audio works, may include spatial audio.

Spatial audio reproduction may include spatializing sound sources in a scene. The scene may be a three-dimensional representation which may include position of each sound source. In an immersive environment, a user may, in some cases, be able to move around and interact in the scene. Spatializing every sound in a scene may be computationally inefficient. Further, resources of the device may vary from one moment to another. Further, different devices may have different capabilities such as processing speed, memory, or other capabilities. Some sounds in the scene may carry greater significance than others.

As such, aspects of the present disclosure describe a method or device that may selectively reduce and combine sound sources in a scene which are then spatially rendered, thereby improving efficiency, or reducing the computational cost of the process. Further, the way the sound sources are reduced and combined may be adjusted based on attributes of the device or in response to application-specific details associated with the scene, or both. In all instances however, the analysis of the scene that is performed for the purpose of clustering, for example selecting and combining several sound sources into a cluster may be based on perceptibility of the sound sources but is endpoint agnostic. This means that the scene analysis and decision making for how to select the sources that make up a cluster does not consider the sound output arrangement (acoustic transducer arrangement, e.g., headphones, surround sound loudspeaker system.) Note however that the contribution of a given sound source to its cluster (or how an audio signal of a given sound source is to be combined with other audio signals of the cluster) may consider the sound output arrangement.

In one aspect, a device comprising a processor may be configured to select a subset of sound sources from a plurality of sound sources in a scene, based on audibility of each of the plurality of sound source. The scene may include geometry of objects, surface materials, positions of sound sources, a listener position, or other information. The device may generate one or more clusters of sound sources with the subset of sound sources. The device may obtain spatial information of the subset of the sound sources from the scene. The subset of sound sources, including at least one individual sound source and the one or more clusters, may be spatially rendered according to the spatial information.

The remaining sounds in the sound scene may be ignored by the spatial renderer. Similarly, sounds that are clustered together are rendered as a single combined source, thereby reducing computational overhead. The remaining individual sound sources (e.g., unclustered sound sources) in the subset of sound sources may be spatially rendered individually. Note here that the analysis performed by the so-called spatial modelers here maintains any endpoint or sound output arrangement-specific metadata that may be used by the renderer when the latter is producing the speaker driver signals for a particular sound output arrangement.

In some examples, for each of a direct sound, indirect sound (e.g., early reflections, and/or late reflections), the processor is configured to select the subset of sound sources, generate the one or more clusters, obtain the spatial information, and render the subset of sound sources according to respective parameters of the direct sound, the early reflections, and the late reflections. As such, the device may have different spatial modelers, one for direct sound, one for early reflections, and one for late reflections, that may each cull, cluster, and query the spatial information of the same scene with its own criteria.

In some examples, the processor is further allocating an amount of time to select the subset of the sound sources, a processor instruction limit or a processor power consumption limit, to generate the one or more clusters, and to obtain the spatial information. This allocation may be determined based on a resource constraint or a device usage. The time allocated to each of these operations may be on a frame-by-frame basis, and the spatial rendering may be performed repeatedly (e.g., continuously). For example, at a first frame, the processor may have X ms to select the subset, Y ms to cluster the sound sources, and Z ms to obtain the spatial information. At a subsequent frame, the processor may reduce each of X, Y, and Z due to reduced resources or a different device usage.

In some examples, a maximum number of sound sources in the subset of the sound sources is determined based on resource constraints or a device usage. For example, with reduced processing resources, the maximum number of sound sources in the subset may be reduced, to reduce the computational cost of spatially rendering those sound sources.

Similarly, a number of sound sources that are clustered may be determined based on a resource constraint or a device usage. For example, in response to less processing resources being available, the processor may cluster more of the sound sources (e.g., creating a larger cluster or clusters), so that the overall number of inputs (including each of the clusters and each individual sound source) to the spatial renderer is reduced.

In some examples, sound sources of each of the one or more clusters are mixed together and spatialized as a whole with a common position. Each of the one or more clusters may be spatialized to a fixed virtual position relative to a virtual position of a listener. For example, sound sources A, B, and C may be clustered together to form a single audio signal which may be rendered as being behind a listener. If sound source A moves in the scene, the cluster of sound sources A, B, and C may remain behind the listener. Thus, clustered sounds may consume less overhead than unclustered sounds (e.g., individual sound sources) due to having less sounds to cluster as well as using less overhead to update a direction of arrival of the cluster to the listener.

In some examples, selecting the subset of the sound sources may be performed based on an audibility threshold or a distance-based loudness model, or both. Additionally, or alternatively, selecting the subset of the sound sources may be performed based on a priority that is assigned to each of the plurality of sound sources, or it may be performed by using a perceptual or psychoacoustic model that is used to analyze the input audio signal and determine relevant perceptual signal aspects, such as the signal's masking ability (e.g., masking threshold) as a function of frequency and time.

In some examples, obtaining spatial information of the subset of the sound sources includes determining a direction of arrival (DOA) for each individual sound of the subset of the sound sources and each cluster of the one or more clusters. The processor may query the scene to obtain metadata describing a position of each sound source, a direction, loudness information, or other metadata, or a combination thereof.

The sounds may be spatialized and combined to form binaural audio that may include a left audio channel and a right audio channel. The channels may be used to drive a left ear-worn speaker and a right ear-worn speaker.

FIG. 1 shows an example of an audio processing device 106 for spatially rendering a scene 104 in accordance with some aspects. An audio processing device 106 may include processing logic 116 that is configured to perform operations and methods described in the present disclosure. Processing logic 116 may comprise hardware (e.g., circuitry, dedicated logic, programmable logic, a processor, a processing device, a central processing unit (CPU), a system-on-chip (SoC), machine-readable memory, etc.), software (e.g., machine-readable instructions stored or executed by processing logic), or a combination thereof.

A scene 104 may include a representation (e.g., a three-dimensional representation) of an environment. It may include objects such as, for example, a bird, a building, a vehicle, a tree, a person, or any other object. The scene may include geometry of each object (e.g., a shape, size, etc.), visual details (e.g., color, texture, markings, etc.). Further, some objects may be associated with a sound source, while others may not. Similarly, some sound sources in the scene may not be associated with an object while others may be. The scene 104 may be representative of an XR environment.

The scene 104 may include one or more sound sources 120. Each object or sound source may have a respective position and/or other spatial information in the scene. A position may include a location and orientation (e.g., a direction). The scene may include surface materials for surfaces of walls, a ground, ceilings, and other objects. The surface materials may be used to determine acoustic properties of the surfaces which may be used to determine the reverberation of the scene. Processing logic may add reverberation to the spatial audio to improve the perceptibility of the spatial audio.

In some examples, as shown, scene 104 may reside on a separate machine that audio processing device 106 may be communicatively coupled to (e.g., over a computer network). In other examples, scene 104 may reside in audio processing device 106. Scene 104 may comprise a single digital asset that contains all the scene information. Alternatively, scene 104 may comprise a collection of digital assets that, together, contain the various information of the scene 104.

Processing logic 116 may select from a plurality of sound sources 120 in scene 104, a subset 122 of sound sources. The selection may be performed based on audibility of each of the plurality of sound sources. For example, processing logic 116 may determine a loudness of each of the sound sources 120 as it would be heard by a listener in the scene. If the audibility (e.g., a loudness) is below a threshold, this may indicate that the respective sound source is not audible, or barely audible such that it may not be worth the effort to spatialize. Processing logic 116 may exclude this sound source from the subset of sound sources, in response to the sound source not satisfying the threshold.

In some examples, a sound source may have metadata indicating an enumerated type (e.g., speech, ambient noise, music, special effects, an alert, etc.) or priority. The audibility of a sound source may be determined based on the loudness and the metadata. For example, processing logic may apply a different threshold loudness for sound sources of diverse types or priorities.

Processing logic may generate one or more clusters 126 of sound sources with the subset 122 of the sound sources. The clustering may also be performed based on the metadata of each sound source. For example, sounds may be clustered based on proximity to each other, or by type, or by priority, or by similarity in loudness, or according to their perceptibility, or a combination of such factors.

In some examples, processing logic may apply one or more rules to select which sounds from the subset of sound sources are to be clustered and which sounds are to be rendered as individual sound source 124. For example, processing logic may enforce a rule such that sounds with a threshold priority and/or having type 'speech' are not clustered, so that those sounds may be treated individually. Additionally, or alternatively, processing logic may enforce another rule that sounds within X distance and of type Y will not be clustered. Additionally, or alternatively, processing logic may enforce a rule such that sounds with priority X or less, that are within Y distance of each other, are to be clustered together. Processing logic may enforce various rules or combinations of rules to perform clustering.

Those of sound sources 120 that are not part of the subset may remain excluded from consideration and thus, are not considered for clustering nor are they spatialized. Processing logic 116 may obtain spatial information 108 of the subset of the sound sources from the scene and ignore those excluded sound sources.

In some aspects, processing logic 116 may obtain spatial information 108 for the sound sources in a selective manner. For example, processing logic 116 may obtain updated spatial information 108 for a sound source or for a cluster of sound sources, in response to when one of the subset of sound sources changes position. If unchanged, processing logic 116 may utilize previously obtained spatial information for the sound source or cluster.

In some examples, the spatial information 108 may include a direction of arrival (DOA), a time of arrival (TOA), and/or respective loudness levels (e.g., on a sub-band basis) for each sound source in the subset of sounds. Similarly, for each cluster, a single DOA, TOA, and set of respective levels may be obtained or determined.

Processing logic may, at block 110, spatially render the subset of sound sources. In some examples, at block 110, the subset of sound sources may include at least one individual sound source 124 (e.g., an unclustered sound source). In some examples, the subset 122 of sound sources may include a mix of at least one individual sound source 124 and one or more clusters 126 of sound sources. In some examples, the subset of sound sources to be rendered may include at least one cluster. The subset of sound sources, whether individual or clustered, may be spatially rendered, according to the spatial information. The sound sources of the one or more clusters 126 are spatialized together and the individual sound sources 124 may be spatialized individually. The sound sources of each of the one or more clusters may be mixed together and spatialized as a whole with a common position. Note here that a cluster need not be a point source, as it could alternatively be represented as a volumetric source.

For example, sound sources 120 may include sound sources A-H. Processing logic 116 may select from sound sources 120, a subset 122 of sound sources to include sound sources A-F. Sound sources G and H are excluded from the spatializing process. Processing logic 116 may cluster sound sources A, B, and C to form a first cluster, and cluster sound sources D and E to form a second cluster. Sound F may be left as an individual sound source. The first cluster has a mix of sound sources A, B, and C and is spatialized as a single sound source at virtual position X. Similarly, the second cluster is spatialized as a single sound source at virtual position Y. Sound F is also spatialized as a single sound source at virtual position Z. As such, the spatial rendering performed at block 110 may perform three spatial rendering operations as opposed to eight (one for each of sound sources A-H).

In some embodiments, processing logic may spatialize each of the one or more clusters to a fixed virtual position relative to a virtual position of a listener. For example, if a listener is at a first virtual position, then the first cluster may be spatialized to be at a fixed position (e.g., behind, or to the left, or at another fixed direction) relative to the listener. Even if some of the sound sources within the first cluster move, and even if the listener's virtual position changes, the cluster may be spatialized with a fixed position relative to the listener, which may reduce computational overhead for processing logic. In some examples, clusters may be rendered at fixed locations around a listener that correspond to regions in the scene 104 that are used to group the sound sources into a cluster. For example, a sound in a scene behind a listener may be clustered together based on the sounds being located at a region in the scene behind the listener. These sounds may be spatialized at a fixed position behind the listener that corresponds to the relative direction of the region in the scene behind the listener. As such, sounds that move into the region behind the listener in the scene may become clustered and spatialized together to the listener to come from that corresponding direction.

Further, the individual sound sources in the subset of sound sources may be rendered based on their individual positions within the scene. As such, if a listener changes position, processing logic may update the spatial rendering of the individual sound source to mimic this change.

At spatial rendering block 110, processing logic 116 may apply spatial filters (e.g., HRTFs or HRIRs) to each of the individual sound sources 124 and to each of the clusters 126. The resulting spatialized audio may be combined into spatial audio 118 that includes a left spatial audio channel and a right spatial audio channel, which may be referred to as binaural audio. Spatial audio 118 may be used to drive speakers 114 of a playback device 112. Speakers 114 may include ear-worn speakers such as in-ear speakers, on-ear speakers, or over-the-ear speakers. In some examples, the playback device 112 may include a display 102 that may show visual components of scene 104. The display 102 may be a standalone display or a head-mounted display.

Figure 2:
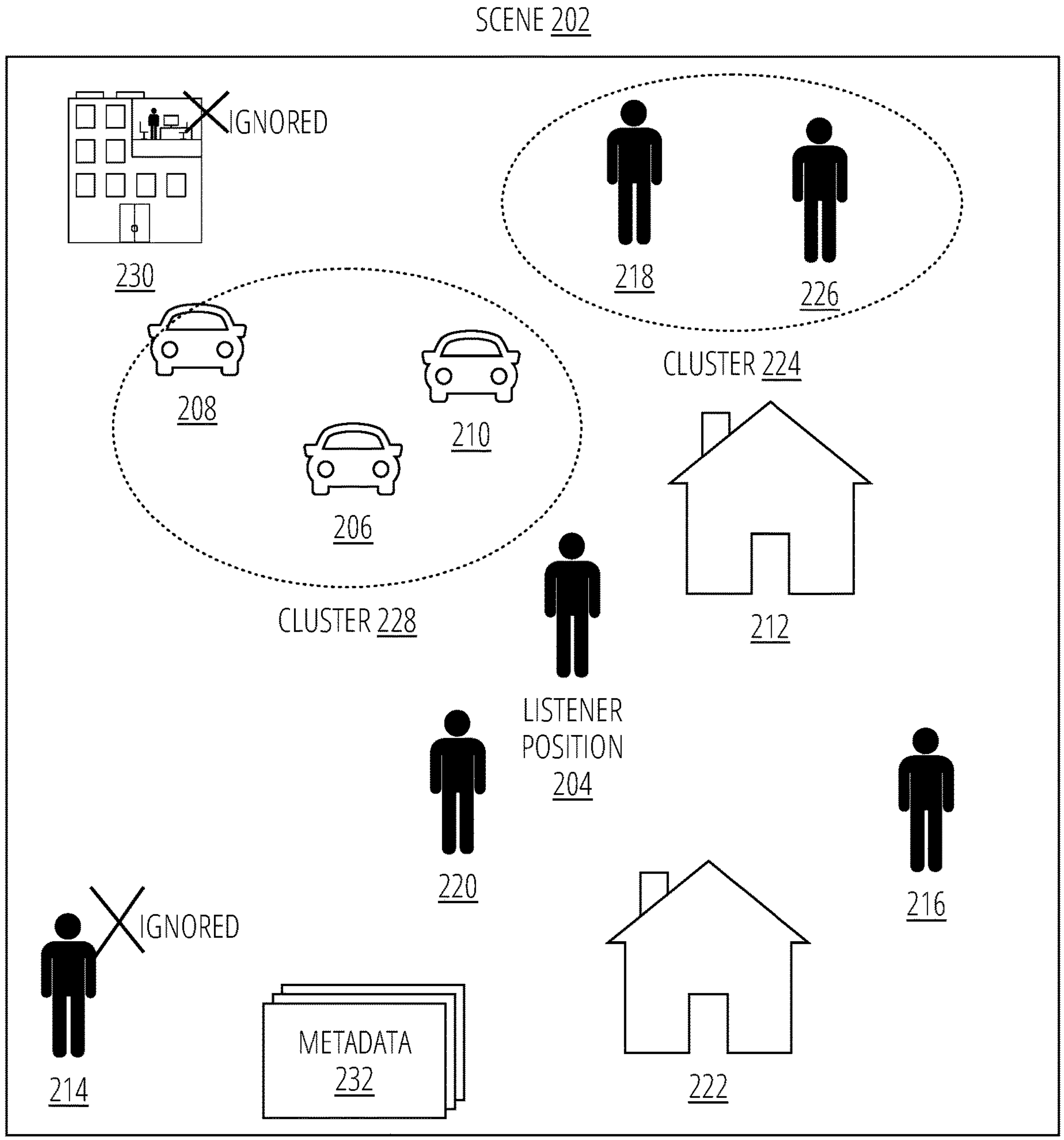
FIG. 2 shows an example of a scene with sound sources, in accordance with some aspects.

FIG. 2 shows an example of a scene 202 with sound sources and other objects, in accordance with some aspects. Scene 202 may include a two-dimensional or three-dimensional representation of an environment with one or more sound sources.

For example, sound sources 208, 210, and 206 are objects in the scene that may be associated with respective sounds (e.g., a vehicle engine, brakes, a vehicle radio, etc.) Further, it is possible that an object such as a vehicle may have multiple sound sources (e.g., a vehicle radio, an engine, etc.) associated with it. Further, the scene 202 may include objects (e.g., buildings, trees, furniture, etc.) such as abuilding 212 and 222 that are not sound sources.

The scene may include a listener position 204. The sound sources in the scene 202 may be spatially rendered with respect to the listener position 204 and respective positions of each of the sound sources in the scene. For example, sound from a person (sound source 220) may be rendered from its respective position to the listener. This may include a direction and a distance relative to the listener position 204. From the perspective of the listener, the direction of a sound source may be expressed in spherical coordinates (e.g., an azimuth and elevation).

Processing logic of a spatial modeler system may select a subset of sound sources from a plurality of sound sources in scene 202, based on audibility of each of the plurality of sound sources. Audibility may be understood as loudness of a sound source as experienced at the listener position 204. In some examples, audibility may be determined for various frequencies (e.g., on a sub-band basis).

Selecting the subset of the sound sources may be performed based on a threshold audibility. For example, processing logic may obtain a loudness of each sound source from the scene 202. Processing logic may query scene 202 to obtain that sound source 230 has a loudness X which does not satisfy a loudness threshold Y.

Loudness X may be determined with a distance-based loudness model. For example, processing logic may query scene 202 to determine the listener position 204, the position of sound source 230, and apply a distance-based loudness model to a distance between the listener position 204 and the position of sound source 230 to attenuate the loudness of sound source 230 and determine the audibility of sound source 230 at listener position 204.

Processing logic may perform audibility testing on each of the sound sources in the scene 202. A loudness threshold may be compared to a loudness of each sound source as heard at listener position 204. In response to the loudness of sound source 230 not satisfying a threshold loudness, processing logic may exclude this sound source 230 from the subset, thereby ignoring this sound source in the continuing workflow.

Additionally, or alternatively, processing logic may select the subset of the sound sources based on a priority that is assigned to each of the plurality of sound sources. For example, the scene 202 may include metadata 232 that may indicate a priority or type of each sound source. In some embodiments, processing logic may use a respective threshold for each type or priority. For example, a sound source with a higher priority may have a lower threshold applied to it than a sound source with a lower priority. Similarly, each type may have its own respective threshold.

Processing logic may generate one or more clusters of sound sources such as clusters 228 and 224, with the subset of the sound sources. For example, if processing logic has excluded sound source 230 and sound source 214 from the subset because they do not satisfy the audibility threshold, processing logic may query scene 202 for the remaining sounds to determine which to cluster and which to leave alone.

Processing logic may cluster sound sources based on type, distance, position, perceptibility, audibility (e.g., loudness at the listener position), or a combination thereof. For example, processing logic will cluster the sound sources 208, 206, and 210 (into a single cluster) in response to them being within a threshold distance from each other, or within a common region of the scene. Processing logic may cluster sound sources 218 and 226 in response to them being the same type (e.g., humans) and located in a common region of the scene 202. In another example, processing logic may cluster sound sources 218 and 226 in response to them being within a threshold distance from each other and within a threshold audibility of each other (relative to listener position 204).

Processing logic may obtain spatial information of the subset of the sound sources from the scene (e.g., sound sources 206, 208, 210, 216, 220). This may include a direction of arrival (DOA) of each of those sound sources relative to the listener position. In some aspects, for clusters, processing logic may obtain spatial information associated with just one of the sound sources and use that spatial information for that entire cluster. For example, processing logic may obtain spatial information for the sound source 206 and use that spatial information for rendering the cluster 228, thereby further reducing computational overhead.

Processing logic may spatially render the subset of the sound sources which may include at least one individual sound source and one or more clusters, according to the spatial information. For example, processing logic may spatially render four audio signals, one for cluster 228, another for cluster 224, another for sound source 220, and another for sound source 216. The audio signals may be combined to form a left and right spatial audio channel.

The operations may be repeated (e.g., periodically, event-based, or both), and the results may differ from one repetition to another. For example, in a subsequent frame, the listener position 204 may change so that sound sources 214 and 230 become included in the subset of sound sources and are no longer ignored. Similarly, processing logic may form different clusters. For example, sound source 218 may move and no longer be clustered with sound source 226. Sound source 218 may move into the region with sound sources 208, 210, and 206, and become clustered with those sound sources. As such, processing logic may adapt which sound sources to ignore and which to cluster, based on changes to the scene 202 or load balancing factors, as discussed in other sections.

Figure 3:
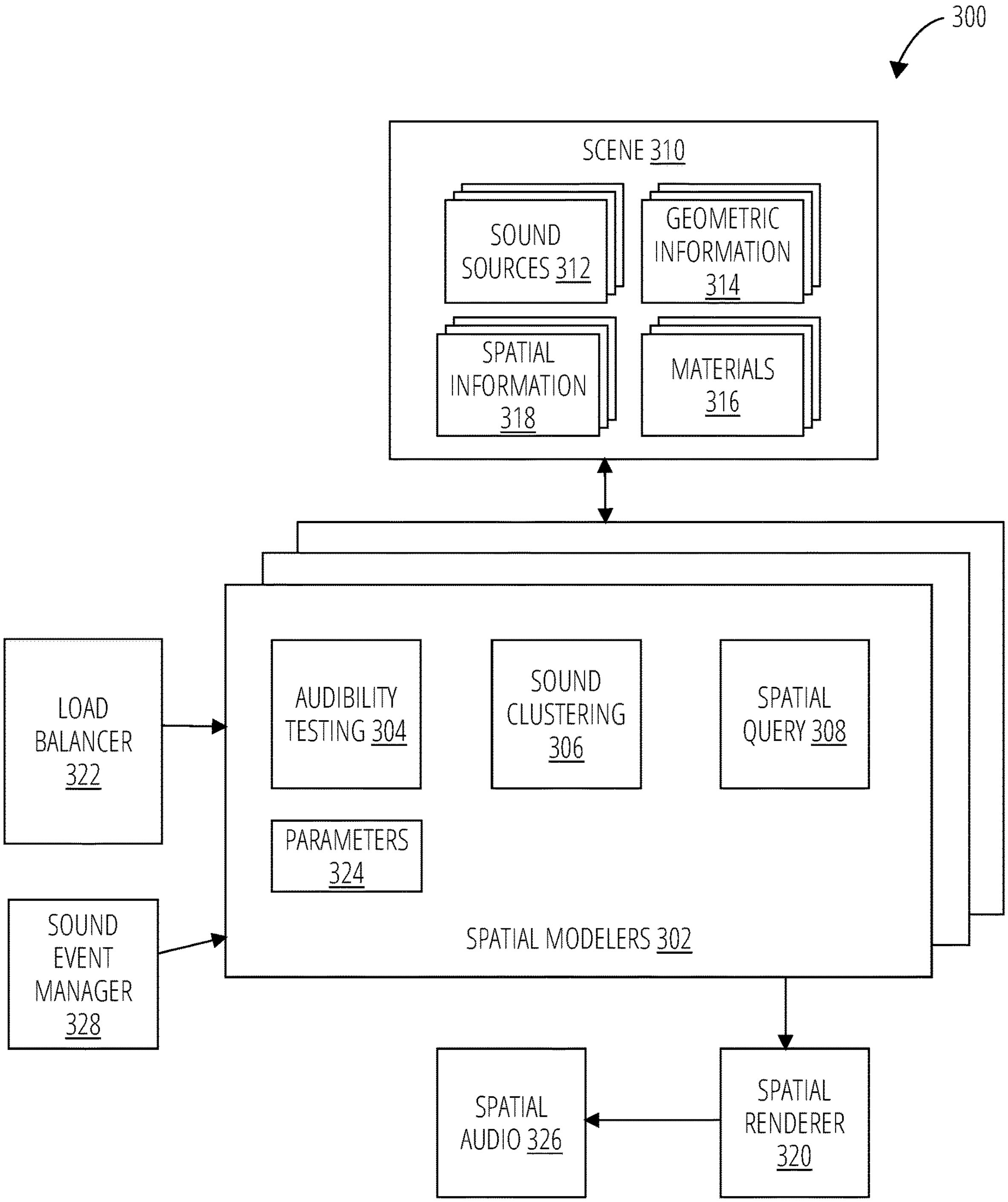
FIG. 3 shows a block diagram of an example spatial modeler system, in accordance with some aspects.

FIG. 3 shows a block diagram of an example spatial modeler system 300, in accordance with some aspects. Spatial modeler system 300 may include processing logic that is configured to perform the described operations. The spatial modeler system 300 may include or access a scene 310 that includes one or more sound sources 312, geometric information 314, spatial information 318, and materials 316. Sound sources 312 may include an audio signal of each respective sound source. Geometric information 314 may include a shape and size of each object in the scene, which may include buildings, trees, terrain, people, furniture, sound sources, etc. Further, the scene may include material 316 for each of the objects, which the processing logic may use to determine reverberant qualities of the scene 202, which may be added to the spatial audio.

Spatial modeler system 300 may include one or more spatial modelers 302. Each one of the spatial modelers 302 may have respective parameters 324 that control how that spatial modeler performs the operations of audibility testing 304, sound clustering 306, and performing spatial query 308. For each of those operations, spatial modeler system 300 may query the scene 310 to obtain information (e.g., geometric information, position information, gains, priority, type, etc.) that is used to select a subset of sound sources (at the block labeled audibility testing 304), cluster the subset of sound sources (at sound clustering 306) and query the spatial information for those sound sources (at spatial query 308). The spatial modeler determines how each sound source contributes to its cluster, and how the cluster is to then be rendered. Note here that in one aspect, the contribution of a given sound source (to its cluster) may be informed by the sound output arrangement through which the sound program is to be rendered. The blocks of audibility testing 304, sound clustering 306, and spatial query 308 may be performed as independent queries into the scene 310 and are not necessarily performed in a particular order.

Spatial modeler system 300 may host the spatial modelers 302 and manage their execution. Each of the spatial modelers 302 may correspond to or implement a separate processing pipeline for each type of sound. For example, a first spatial modeler of the spatial modelers 302 may correspond to or implement a processing pipeline only for direct sounds (a direct path) between sound sources 312 and a listener in the scene. A second spatial modeler of the spatial modelers 302 may correspond to or implement a processing pipeline only for indirect sounds (an indirect path between the sound sources 312 and the listener.) In some examples, a spatial modeler may be dedicated to early reflections of the sound sources 312 in the scene. Additionally, or alternatively, a spatial modeler may correspond to late reflections of the sound sources 312 in the scene. In another example, a spatial modeler may correspond to or implement a processing pipeline only for ambient sound which is sound that is spatialized outside of the listener's head but is not reverberated, not distance attenuated or otherwise not modified using environmental processing (e.g., rainfall.) Each of the spatial modelers 302 may send respective independent sound sources and/or clusters to the spatial renderer 320. As such, the result may include spatial audio for the direct path, a second spatial audio for early reflections, and a third spatial audio for the late reflections. The spatial modeler system 300 may combine these spatial audio components to form a spatial audio representation 326 of scene 310. Spatial audio representation 326 may be binaural audio. In some aspects, it may be another spatial audio format (e.g., a surround sound speaker format or Ambisonics format).

Spatial renderer 320 may apply spatial filters such as HRTFs (in the frequency domain) or HRIRs (in the time domain) to the audio signals of each individual sound source or cluster of sound sources. The resulting spatial audio from each of the sound sources and from each of the spatial modelers 302 may be combined (e.g., summed) to provide an immersive scene with all the subset of sound sources represented (either individually or as a cluster) and with direct, early reflections, and late reflections accounted for. Spatial renderer 320 may render audio without using HRTF or HRIR. For example, spatial renderer 320 may generate audio output (or speaker driver signals) in mono, as a surround sound audio format (e.g., 7.1, 6.1, 5.1, etc.). Spatial renderer 320 may determine the reverberation time, or associated impulse response for convolution, or both. In the case of the direct path, spatial renderer 320 may determine distance-based gains, obstruction EQ (transmission loss), or other parameters that provide a spatial dimension to the audio that may be determined using information from each spatial query. The spatial query may take each of the rendering clusters and determine a rendering plan based on their representation. The overall system may use the rendering plan for initialization (e.g., to provide the rendering plan to a real-time thread). The output of the spatial query or each spatial query may include instructions as to how to spatially render the source or group (e.g., rules and/or spatial parameters).

Spatial modeler system 300 may include load balancer 322 that scales how each of the spatial modelers 302 perform their respective operations in view of one or more factors which may be dynamic, static, or both. The load balancer 322 may scale parameters 324 to manage tradeoffs between spatial rendering quality, system resource constraints, and device usage. In one aspect the load balancer manages behavior of one or more of the spatial modelers 302 based on sound events. In another aspect, the load balancer manages behavior of one or more of the spatial modelers 302 based on complexity of the sound scene (e.g., an office versus a cathedral.)

In some examples, load balancer 322 may select a profile (e.g., from a registry) which may be used to transform the parameters 324 for a given one of the spatial modelers 302. Load balancer 322 may obtain device information such as system resource constraints (e.g., CPU usage, memory availability, network throughput, etc.), thermal load (e.g., a device temperature), device usage (e.g., co-presence, a game, a conference call, a presentation, a movie, a live show, etc.), or other device information. Load balancer 322 may scale the parameters 324 in view of the device information. In some cases, based on the system resource constraints, thermal load, device usage, or a combination thereof, load balancer 322 may increase the quality of the spatial rendering (thereby increasing the computational overhead). In other cases, based on the system resource constraints, thermal load, device usage, or a combination thereof, load balancer 322 may decrease the quality of the spatial rendering (thereby decreasing the computational overhead).

For example, load balancer 322 may obtain a profile for a particular use case (e.g., co-presence, a game, etc.) and each profile may contain parameters 324 or rules on how to adjust parameters 324 to suit the particular use case. A first profile may specify or adjust parameters for performing audibility testing 304 to reduce the number of sound sources more aggressively in the subset of sound sources. A second profile may specify or adjust parameters for performing audibility testing 304 to be more inclusive of the sound sources in the scene, thereby ignoring fewer sound sources sounds.

Similarly, in a co-presence scenario, some sound sources such as human speech from a listener, may have a lowered audibility threshold than other sound sources. In such a manner, if another user's speech is low but still satisfies the lowered audibility threshold, then it is not ignored. The spatial modeler system 300 may make other use-case specific parameter adjustments. The use case may be associated with the scene 310. For example, the use case may be a co-presence use case with multiple listeners in the scene 310, or a movie use case where the scene 310 is that of an immersive movie, or a gaming use case where the scene is that of the game.

In some examples, load balancer 322 may obtain hardware information such as serial or model numbers, software information such as software versions and model numbers, or other information. Load balancer 322 may adjust the parameters 324 based on such information. For example, in response to some hardware or software information load balancer 322 may retrieve a profile for that hardware or software or combination of hardware and/or software, to determine the parameters 324.

In some examples, in response to increased system resources, load balancer 322 may exclude fewer sound sources or fewer cluster-less sound sources, or both. In response to reduced resources, load balancer 322 may exclude more sound sources or cluster more sound sources, or both.

In some examples, load balancer 322 may allocate an amount of time to each of audibility testing 304 (to select the subset of the sound sources), sound clustering 306 (to generate the one or more clusters), and spatial query 308 (to obtain the spatial information) based on system resource constraints or device usage, or both.

In some examples, load balancer 322 may determine a maximum number of sound sources in the subset of the sound sources based on system resource constraints or device usage, or both. For example, in response to more system resources being available (e.g., more CPU bandwidth, memory, etc.), load balancer 322 may increase the maximum number of sound sources in the subset of the sound sources, which may also be implemented by reducing the number of sound sources in the scene that are to be ignored. Similarly, in response to less system resources being available, load balancer 322 may decrease the number of sound sources in the subset of the sound sources.

In some examples, load balancer 322 may determine the maximum number of sound sources in the one or more clusters of sound sources based on a system resource constraint or a usage of the device. For example, with more system resources, the number of sound sources that are to be placed in the clusters may be reduced (because more sounds sources can be rendered individually due to greater system resources being available.) In some cases, the load balancer may shut off or disable clustering with more system resources or in response to a particular use case. In another aspect, the load balancer manages behavior of one or more of the spatial modelers 302 based on complexity of the sound scene.

As such, load balancer 322 may adjust how a scene is rendered based on the use case or system resource constraints of a device, in a manner that finds sensible tradeoffs between spatial rendering quality, computational overhead, and other considerations.

In some examples, a sound event manager 328 may manage behavior of spatial modelers 302 based on sound events. A sound event may be an event used to quantize or determine a start time, logic, and control for a sound source. A sound event can have one or more sounds triggered by it. Based on status of sound events (e.g., an existence of a sound event, the number of sound events, etc.), the sound event manager 328 may determine behavior of each spatial modeler. For example, depending on the status of the sound events, the sound event manager 328 may cause a spatial modeler to run in attack mode, sustain mode, or overflow mode. The sound event manager 328 and load balancer 322 may provide a comprehensive audio solution that performs load balancing and manages system resources based on usage and real-time audio considerations, which may include assessment of the scene 310 as well as conditions outside the scene 310. In some examples, a sound event may include a single sound loaded by the system as a "one shot." When the sound event is started, the sound plays, and the sound event may simply end or be discarded when the sound completes. In other examples, a sound event may run as a loop and be used with a transport control to play, pause, or seek until the system is done with the sound (e.g., the sound is no longer relevant to the scene). In some examples, sound events may include the concept of conditional logic graphs. For example, a single sound event may include multiple versions of a footstep. The system may trigger the event instance each time a step event occurs in the scene, but the system may select an appropriate footstep for other conditions and metadata. In addition, a sound event is like a container for multiple such logic graphs or sounds. For example, a sound event may include a swarm of bees represented by several sources with a few different spatial anchors. A sound event can also be a mix of synchronized sound objects with different rendering intentions. For example, a sound event may include an ambient bed mix which is played with an ambient spatial mixer or modeler and one or more 3D spatial objects which are meant to be in the scene while the ambient mix is playing. A sound event may include a 3D sound source which is intended for some mix of modelers (for example, only direct path, or direct path and reverberation).

The system 300 may resolve the various intentions which may be represented by the various sound events and add the sounds to the appropriate spatial modelers 302, so not every sound event is present in every modeler. If all sound events are already triggered, the sound event manager may run one or more of the modelers in a "sustain" mode by performing periodic updates so that the positions and models of these sounds are up to date.

In some examples, when a new sound event is triggered, it may be undesirable to wait for periodic updates, such as in the case of reverberation could take several hundred milliseconds to update. For new sound event triggers, sound event manager 328 may operate the spatial modelers 302 in an "attack" mode. This runs the new event on a fast track to see if the sound associated with the new sound event can quickly be clustered to one of the existing clusters or do a minimum launch to get the sound started.

In some examples, if there is a growing backlog of attacking sources and each of the sources cannot be rendered within a predetermined time, the sound event manager may operate the spatial modelers 302 in an "overflow" mode which is a hybrid periodic intake of several sound events.

As such, the system may select the subset of the sound sources, generate the one or more clusters, obtain the spatial information, or render the subset of the sound sources according to respective parameters of one or more spatial modelers that may run in a plurality of modes (e.g., attack, overflow, sustain, etc.). With such features, the load balancer 322 and sound event manager 328 may quantize spatial modeler system jobs into manageable buckets without introducing lag to the user experience.

Figure 4:
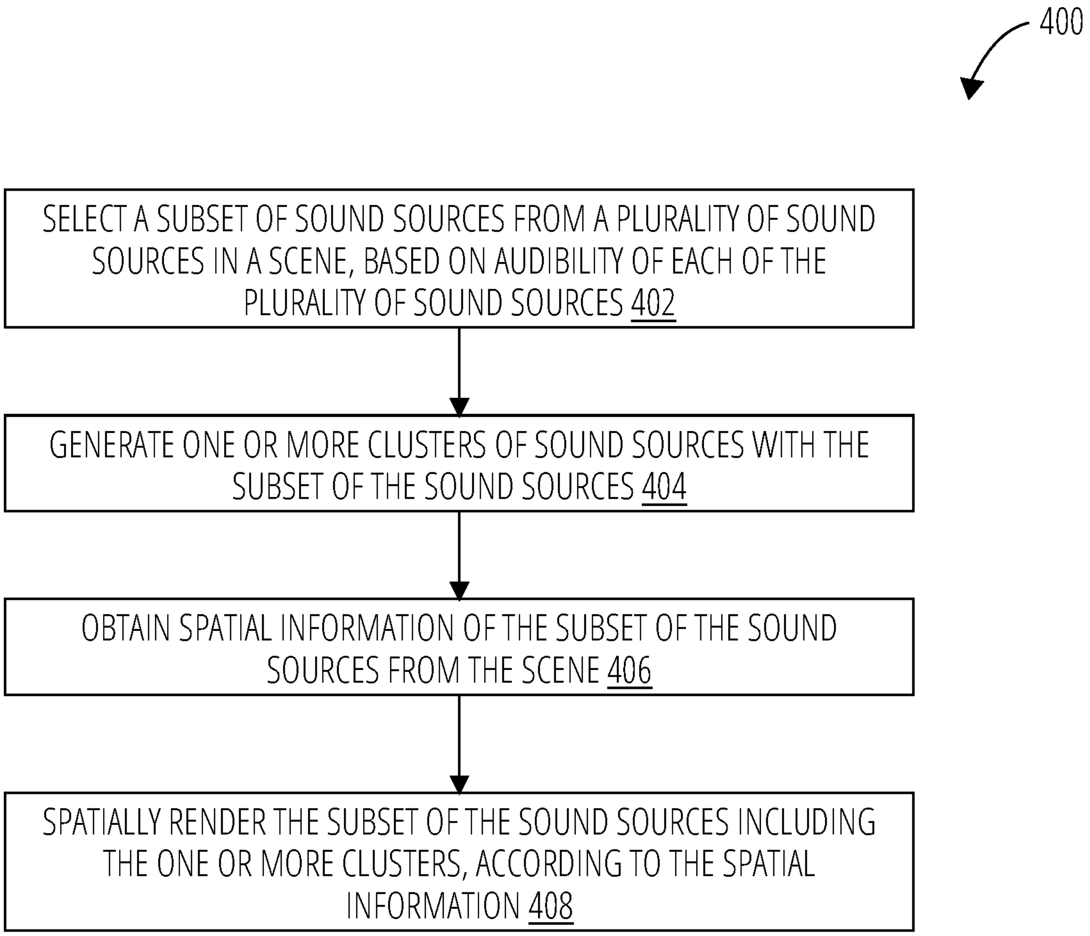
FIG. 4 illustrates an example of a method for spatially rendering a scene, in accordance with some aspects.

FIG. 4 illustrates an example of a method 400 for spatially rendering a scene, in accordance with some aspects. The method may be performed with various aspects described. The method may be performed by processing logic of a capture device, an audio processing device, or a combination thereof. Processing logic may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all the blocks in the method may be performed.

At block 402, processing logic selects a subset of sound sources from a plurality of sound sources in a scene, based on audibility of each of the plurality of sound sources. In some examples, audibility may be determined by estimating a loudness of a sound source as it will be rendered to a listener position in the scene. This may include applying a distance-based loudness model such as, for example, the inverse square law, or other model that increasingly attenuates loudness of a sound over a distance. If the audibility of a sound source does not satisfy a threshold (e.g., the estimated loudness at the listener position is below a threshold), then the sound source may be excluded from the subset, such that it is ignored by the remainder of the process.

At block 404, processing logic generates one or more clusters of sound sources with the subset of the sound sources. This may include selecting two or more sound sources and then combining them (e.g., through sound mixing) to form a combined audio signal. Multiple clusters may be formed. Those sound sources in the subset of sound sources that are not clustered may be spatialized individually, while those that are clustered may be spatialized as a single combined sound source, thereby reducing computational overhead.

At block 406, processing logic obtains spatial information of the subset of the sound sources from the scene. As described, this may include querying the scene for a direction of arrival (DOA), a time of arrival (TOA), or other spatial information of the sound sources in the subset. The spatial information may be obtained relative to a listener position in the scene. The listener position may be understood as a virtual listener position. The scene may represent an XR environment, or other spatial audio environment. In some examples, block 402, block 404, block 406, or a combination thereof may be informed by load balancing conditions, such as those described.

At block 408, processing logic spatially renders the subset of the sound sources. The subset of sound sources may include a mix of individual and clustered sound sources. In some examples, the subset of sound sources may include at least one individual sound source and one or more clusters. Regardless of the mix, processing logic may render the subset of sound sources according to the spatial information. The sound sources of the one or more clusters may be spatialized together and the individual sound sources are spatialized individually. Processing logic may perform the blocks in 'real-time' or 'offline' or a combination thereof. Real-time may refer to processing of the scene for playback simultaneous to a current playback during which the speakers 114 are actually driven by respective audio signals (produced by the renderer) that represent active sound sources in the scene. Active sound sources are sound sources in the scene that are heard from the speakers 114 during the current playback. In contrast, inactive sound sources are sound sources in the scene that are not heard during the current playback but will be heard during future playback of the scene. In one aspect, the renderer is rendering one or more clusters that represent inactive sound sources during the current playback, but the result of this rendering which are audio signals produced by the renderer are not actually driving the speakers 114 (hence their sound sources are not being heard.) This is referred to here as a pre-warming process.

Real-time processing may include some delays that may be present due to processing time, buffering, transmission, etc. Offline may refer to processing of the scene and using the resulting information later for playback. For example, in an offline case, at block 408 processing logic may encode an audio file for later playback. Further, in some examples, processing logic may render the subset of sound sources as non-spatial audio (e.g., as stereo, mono, or another non-spatial audio format) Processing logic may determine an audio format to render the audio based on user input, device capabilities, metadata, or other criteria.

As described, processing logic may scale how many sound sources are selected to be in the subset of sound sources, as well as how many sound sources are to be clustered, based on system resource constraints, a device usage (e.g., a use case), or a combination of these or other factors. By doing so, processing logic may increase the quality of the spatialized audio (and increase overhead of the operation) when the resources are available, or when the use case calls for such. Similarly, processing logic may decrease the quality of the spatialized audio (and reduce overhead of the operation) when the resources are scarce or when the use case demands less spatial audio quality.

In some examples, rendering group combinations may be weighted (e.g., frequency dependent or independently). For example, even if a rendering group shares a single rendering filter (e.g., a spatial filter), the individual sound sources (even those in a group or cluster) may each have associated gains, equalizations (EQs) or time delays weighting their contribution to the shared renderer. The weights may distribute the contribution of each sound source to the overall sound scene, even if a sound source is clustered. For instance, a frequency dependent weighting may be applied to a first sound source (in a cluster) that is occluded by a wall or other sound obstruction but not to a second source (in the cluster) that is not occluded.

In some examples, a given spatial modeler (e.g., spatial modeler 302) can cluster one or more rendering groups which might have different rendering behaviors. For example, a first spatial modeler can cluster sound sources for individual sources. A second spatial modeler can cluster sound sources in the same scene for a static virtualizer. A third spatial modeler can cluster sound sources in the same scene for Ambisonic, reverb bus, etc.

In some aspects, processing logic may apply one or more spatial modelers, each with N number of query stages. In some examples, the queries may be made for individual sounds/voices in the modeler (e.g., for the audibility testing query). In some examples, the queries may be made holistically for all sounds within the modeler (e.g., sound clustering) or per rendering group (e.g., the spatial query). The makeup of these queries may change without departing from the scope of the disclosure.

In some examples, sound clustering can include a multi-stage approach of both analysis and synthesis. Analysis may include shared batches of ray tracing. Synthesis may include perceptual rendering groups. For example, processing logic might make a culling pass on individual sounds in a scene. Processing logic may then perform a holistic cull/cluster based on priority and load balancing requirements for analysis. Those groups may be spatially analyzed in resulting groups. Processing logic may make further rendering groupings based on real-time graph constraints or other factors. In some cases, a rendering constraint may include fixed data definitions such as a 7-channel virtualizer and 4 voices in a pool. The methods described above may be performed one or more processors (generically referred to here as "a processor") configured in accordance with instructions stored in a non-transitory machine-readable medium (e.g., solid state memory.)

In the description, certain terminology is used to describe features of various aspects. For example, in certain situations, the terms "module", "processor", "unit", "renderer", "system", "device", "filter", "engine", "block," "detector," "simulation," "model," and "component", are representative of hardware and/or software configured to perform one or more processes or functions. For instance, examples of "hardware" include, but are not limited or restricted to, an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to convey the substance of their work most effectively to others skilled in the art. An algorithm is here, and, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined, or removed, performed in parallel or in serial, as desired, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination of hardware devices and software components.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are recognized as meeting or exceeding industry or governmental requirements for maintaining the privacy of users. Personally identifiable information data should be managed and handled to minimize risks of unintentional or unauthorized access or use, and the nature of authorized use should be clearly indicated to users.

What is claimed is:

1. A device, comprising a processor configured to:

a) select a subset of sound sources from a plurality of sound sources in a scene, based on audibility of each of the plurality of sound sources;

obtain spatial information of the subset of sound sources from the scene;

b) generate one or more clusters of sound sources with the subset of sound sources and with the spatial information of the subset of sound sources, wherein the processor is configured to generate the one or more clusters according to respective parameters of i) a direct sound model that represents a direct sound path and ii) an indirect sound model that represents early reflections, late reverberation, or both; and spatially render the one or more clusters as a single combined source, and spatially render at least one other sound source, of the plurality of sound sources, individually, and wherein the processor is configured to manage behavior one or more spatial modelers that perform a) and b), based on sound events, wherein a sound event is used to determine a start time, logic, and control for a sound source, and depending on a status of the sound events the one or more spatial modelers is configured to run in attack mode, sustain mode, or overflow mode.

2. The device of claim 1, wherein the one or more clusters that are spatially rendered by the processor represent active sound sources in the scene, active sound sources being sound sources that are heard during a current playback, the processor being further configured, during the current playback, to generate and spatially render one or more other clusters which represent sound sources in the scene that are inactive, inactive sound sources being sound sources that are not heard during the current playback but will be heard during future playback of the scene, wherein the inactive sources are being rendered into a plurality of audio signals that are not driving any speakers during the current playback.

3. The device of claim 1, wherein the processor is further to allocate an amount of processing time or a processor instruction limit or a processor power consumption limit to select the subset of sound sources, to generate the one or more clusters, and to obtain the spatial information, and wherein the amount of processing time or processor instruction limit is determined by the processor based on a system resource constraint or a usage of the device.

4. The device of claim 1, wherein a maximum number of sound sources that can be selected to be in the subset of sound sources is determined by the processor based on a system resource constraint or a usage of the device.

5. The device of claim 1, wherein a number of clusters is determined by the processor based on a system resource constraint or a usage of the device.

6. The device of claim 1, wherein sound sources of each of the one or more clusters are mixed together and spatialized as a whole with a common position.

7. The device of claim 1, wherein selecting the subset of sound sources is performed based on a threshold of audibility or a distance-based loudness model or a perceptibility model.

8. The device of claim 1, wherein selecting the subset of sound sources is based on a priority or categorization that is assigned to each of the plurality of sound sources.

9. The device of claim 1, wherein the scene includes geometry of objects, surface materials, and positions of sound sources.

10. The device of claim 1, wherein obtaining spatial information of the subset of sound sources includes determining a direction of arrival (DOA), a time of arrival (TOA), a frequency-dependent or frequency independent weighting, or other metadata for describing a contribution to the cluster of each individual sound source of the subset of sound sources that make up the cluster.

11. A method, comprising:

a) selecting a subset of sound sources from a plurality of sound sources in a scene, based on system resource constraint, a device usage, or a priority of each of the plurality of sound sources;

b) generating one or more clusters of sound sources with the subset of sound sources, wherein a)-b) does not consider a sound output arrangement;

managing behavior of one or more of a plurality of spatial modelers that perform a) and b), based on sound events, wherein a sound event is used to determine a start time, logic, and control for a sound source, and depending on a status of the sound events the spatial modeler is configured to run in attack mode, sustain mode, or overflow mode;

c) obtaining spatial information of the subset of sound sources from the scene; and spatially rendering for the sound output arrangement, the one or more clusters as a single combined source, and spatially and individually rendering for the sound output arrangement at least one other sound source of the plurality of sound sources.

12. The method of claim 11, further comprising managing behavior of one or more of the plurality of spatial modelers that perform a)-b) based on evaluating complexity of the scene.

13. The method of claim 11, further comprising allocating a maximum amount of time to be spent and a maximum number of clusters for the spatial modeler to select the subset of sound sources and generate the one or more clusters.

14. The method of claim 11, wherein selecting the subset of sound sources is further determined based on an audibility or perceptibility of each of the plurality of sound sources in the scene.

15. The method of claim 11, wherein a number of the one or more clusters of sound sources is determined based on the system resource constraint or a use case associated with the scene.

16. The method of claim 11, wherein sound sources of each of the one or more clusters are mixed together and spatialized as a whole with a common position.

17. An article of manufacture comprising a machine-readable medium having stored therein instructions that configure a processor to:

a) select a subset of sound sources from a plurality of sound sources in a scene, based on audibility of each of the plurality of sound sources;

obtain spatial information of the subset of sound sources from the scene;

b) generate a cluster with the subset of sound sources and with the spatial information of the subset of sound sources;

manage behavior of one or more of a plurality of spatial modelers that perform a) and b), based on sound events, wherein a sound event is used to determine a start time, logic, and control for a sound source, and depending on a status of the sound events the spatial modeler is configured to run in attack mode, sustain mode, or overflow mode; and spatially render the scene, by spatially rendering the cluster as a single combined source and by spatially rendering one other sound source of the plurality of sound sources individually.

18. The article of manufacture of claim 17 wherein the machine-readable medium has stored therein further instructions that configure the processor to perform a load balancing function, wherein the load balancing function allocates an amount of processing time, a processor instruction limit, or a processor power consumption limit, for performing the following operations: selecting the subset of sound sources, generating the cluster, and obtaining the spatial information, and wherein the amount of processing time, the processor instruction limit, or the processor power consumption limit is determined by the processor based on a system resource constraint or a usage of a device on which the scene is rendered.

19. The article of manufacture of claim 18 wherein the load balancing function determines a maximum number of sound sources that can be selected to be in the subset of sound sources, based on the system resource constraint or the usage of the device.

20. The article of manufacture of claim 18 wherein the load balancing function determines a number of clusters based on the system resource constraint or the usage of the device.

* * * * *